United States Patent [19]

Adams et al.

[11] 4,336,595
[45] Jun. 22, 1982

[54] STRUCTURAL LIFE COMPUTER

[75] Inventors: Thomas E. Adams, Marietta; Walter D. Murray, Roswell; Raymond F. Woolf, Smyrna, all of Ga.

[73] Assignee: Lockheed Corporation, Burbank, Calif.

[21] Appl. No.: 277,904

[22] Filed: Jun. 26, 1981

Related U.S. Application Data

[63] Continuation-in-part of Ser. No. 959,983, Nov. 13, 1978, abandoned, which is a continuation of Ser. No. 826,720, Aug. 22, 1977, abandoned.

[51] Int. Cl.$^3$ .............................................. G01M 5/00
[52] U.S. Cl. ................................... 364/508; 73/802; 235/92 MT
[58] Field of Search ............... 364/506, 508, 552, 554; 73/116, 802, 849, 851; 235/92 MT, 92 CA, 92 AE; 244/117 R, 119

[56] References Cited

U.S. PATENT DOCUMENTS

| | | | |
|---|---|---|---|
| 3,387,120 | 6/1968 | Funk et al. | 364/508 |
| 3,398,266 | 8/1968 | Willis | 73/805 |
| 3,426,586 | 2/1969 | Kadlec | 73/767 |
| 3,495,079 | 2/1970 | Halawa et al. | 364/508 |
| 3,731,526 | 5/1973 | Games | 364/508 |
| 3,733,424 | 5/1973 | Pitts et al. | 235/92 AE |
| 3,758,758 | 9/1973 | Games et al. | 364/508 |
| 3,955,070 | 5/1976 | Suzuki et al. | 235/92 CA |
| 3,979,579 | 9/1976 | Kleinpeter | 364/506 |
| 3,979,949 | 9/1976 | Smith | 73/787 |

Primary Examiner—Errol A. Krass
Attorney, Agent, or Firm—John J. Sullivan

[57] ABSTRACT

This is an electronic device which determines the fatigue life of a structure and its crack growth characteristics when subjected to repeated loading by using the signal from an electrical resistance type strain gage secured to the structure to provide the input to a processor which monitors cyclic excursions, calculates the fatigue and fracture structural damage from those excursions, stores the cumulative damage, and displays that damage on command.

9 Claims, 8 Drawing Figures

STRUCTURAL LIFE COMPUTER

This is a continuation-in-part of pending prior continuation application Ser. No. 959,983 filed Nov. 13, 1978 and now abandoned which was a continuation application of a pending prior application Ser. No. 826,720 filed Aug. 22, 1977 and now abandoned.

This invention relates in general to mechanisms which measure fatigue and fracture characteristics of structures and more particularly to such mechanisms which calculate the portion of the life of the structure spent or used whereby the remaining life of the structure may be readily determined.

While the present invention is designed and adapted for use in testing and in determining the durability of structures generally, it finds especial utility in monitoring the fatigue and fracture characteristics of airframe components during actual operation of the aircraft. These characteristics are immediately available for comparison with forecast fatigue and fracture characteristics and the life expectancy calculated in real time.

Structures or machines, such as for example aircraft, which are subject to cyclic loads have a finite life before cracks form and render them unsafe for continued use. The actual life of a machine is dependent upon the operational loading imposed and a vehicle, particularly an aircraft, is subjected to a wide range of random loads which vary depending upon the particular weight, speed environmental conditions, etc. This variation in loading has a strong influence on the actual fatigue damage and therefore cannot be statistically expressed accurately in today's state of the art.

At the present time, flight recorders are employed to provide limited information such as velocity, acceleration and sometimes even strain data. None of these recorders produce enough data to define the total accumulation of wear on the individual structure. Many assumptions and averaging methods are required in after-the-fact damage analysis because of the cost restrictions on present recording systems.

The usual procedure followed in structural testing or flight recording is to extract the signal from an electrical strain gage secured to the structure, convert this signal from analog to digital and record this number representation of the signal on magnetic tape. Following completion of a portion or all of the test or recording program, the magnetic tape may than be analyzed by various means to determine the portion of the life of the structure which has been expended. It is readily apparent that with the analysis being accomplished after completion of the test, an incorrect position of the fatigue life of the structure may be expended inadvertently. For this reason, it is extremely desirable to evaluate the effects of such loading on the component being studied as soon as possible.

Illustrative of the foregoing state of the art procedure in aircraft structural damage tracking is a report entitled "C-5A Individual Airplane Service Life Monitoring Program (IASLMP)"; see pages 3,002 et seq; dated Jan. 1, 1974 prepared by Lockheed-Georgia Company, Marietta, Ga. 30063. Copies of this report are available from the Lockheed-Georgia Company at the above address or from the Aeronautical Systems Division, Wright-Patterson Air Force Base, Ohio, 45433.

Also illustrative of the state of the art procedures and equipment are disclosures found in AIRLIFTERS Magazine, Vol. 3 No. 2 Spring 1969, "USAF/LOCKHEED TRACKING C-130 FATIGUE DAMAGE" and in Proceedings of the Air Force Conference held at Miami, Fla. Dec. 15–18, 1969 on Fatigue and Fracture of Aircraft Structures and Materials, AFDL TR 70-144, "The Development and Implementation of a Fatigue Monitoring Program For a Transport Aircraft".

The present invention overcomes the foregoing and other limitations of the existing systems by making real time evaluations employing a small, light weight and low cost computing system programmed to make these calculations using the latest analytical methods while the structure experiences them. Stated differently, this invention provides the desired analysis as it occurs, load excursion by load excursion, and thus prevents any incorrect evaluation of loading history. Because of the above noted problems in the prior art the instant invention offers significant advantages and savings.

In essence, the device proposed herein eliminates the need for massive storage capacity to completely describe the load history and only a simple calculation technology memory device is needed to retain the data for life evaluations of a fleet of vehicles. A secondary but important feature is the capability to re-program the logic unit to account for test results from full scale fatigue tests and/or in service experience that needs to be reflected in the analytical methods of predicting the structural durability.

A related economic feature is the ability to extend the major inspection intervals recommended by the producer and thereby save both out of service time and direct labor costs. In addition, this device can effectively be utilized in all structures in which fatigue is a design consideration, such as for example bridges, towers, cranes, elevators, trucks, oil tankers, and the like.

With the above and other objects in view as will be apparent this invention consists in the construction, combination and arrangement of parts all as more fully described, claimed and illustrated in the accompanying drawings, wherein:

Figure 1:
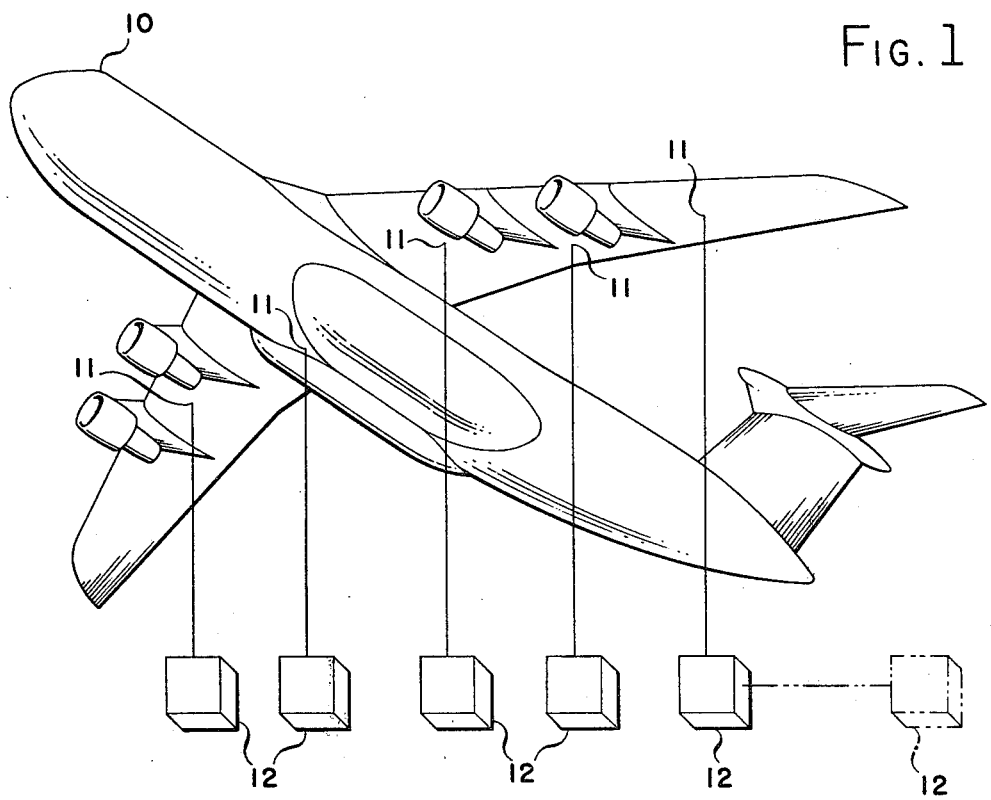
FIG. 1 is a perspective view of an airplane with selected high stress locations thereof indicated where monitoring of structure may be desirable to typify application of a system using the structural life computer as herein proposed.
Figure 2:
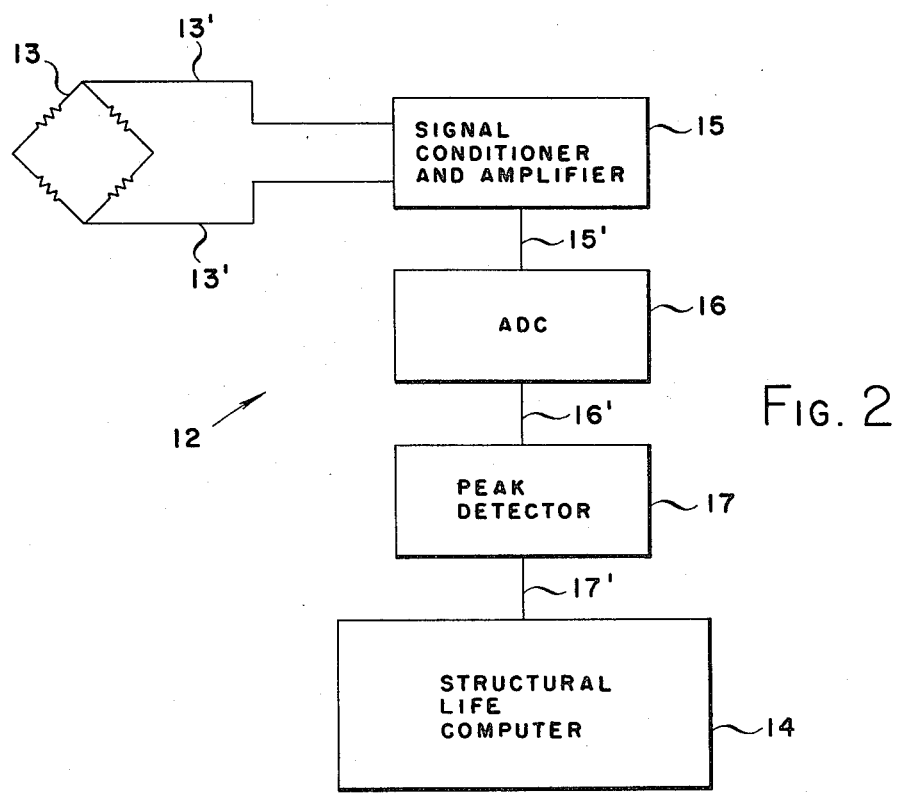
FIG. 2 is a schematic of the system including the structural life computer of this invention extracted from the airplane depicted in FIG. 1.

Referring more particularly to the drawings 10 is illustrative of an airplane, the structural components of which are to be tested, i.e., monitored and the fatigue and structure crack damage indicated to facilitate a determination of the life expectancy thereof. Precise points 11 of the airframe are rigged with sensors which constitute an integral part of the test or monitoring system designated generally at 12. FIG. 2 shows the essentials of the monitoring system 12 which comprises the several sensors, each being for example an electrical resistance type strain gage 13 bonded to the airplane structure and electrically connected to a structural life computer 14 through a standard signal conditioner and amplifier 15, and analog-to-digital converter 16 (ADC) and a strain peak detector 17.

More specifically, a changing signal generated by the strain gage 13 is transmitted to the signal conditioner and amplifier 15 through conductors 13'. Such a conditioner and amplifier 15 is similar to that illustrated and described in the "Strain Gage Primer" by Perry and Lissner, Copyright 1962, and published by McGraw-Hill (second edition), Chapter 5 at pages 77 and 78. The signal thus received by the conditioner and amplifier 15 is thereby changed from an electrical resistance difference to a signal which is analogous to a change in stress in the structural part to which the gage 13 is connected or bonded. The analogous stress signal is then transmitted through a conductor 15' from the signal amplifier and conditioner 15 to the ADC 16. The ADC 16 changes this signal from an analog type signal to a signal which is made up of a series of numbers which represent the changing values of the analog signal. Such an ADC is described in Chapter 3, pages 3-1 to 3-35 of "Data Conversion Handbook" by Donald B. Bruck, Copyright 1974, published by Hybrid Systems Corporation.

It is similar to AMADC 940 made and sold by Analog Devices Corporation, Department G, P.O. Box 280, Norwood, Maine.

From the ADC 16 the digital signal is transmitted through a conductor 16' to the peak detector 17 which determines the maximum and minimum values of the stress excursions. The peak detector 17 is of conventional design being constructed so as to receive each number in that series which comprises the signal from the ADC 16 and compare it to the previous number to determine whether or not its absolute value is greater than the absolute value of the previous number. If the absolute value of the entering number is less, by some predetermined value such as for example 200 psi than the absolute value of the previous number, then the previous number is determined to be a peak. These values or peaks from the detector 17 are then transmitted through a conductor 17' to the structural life computer 14.

Figure 3:
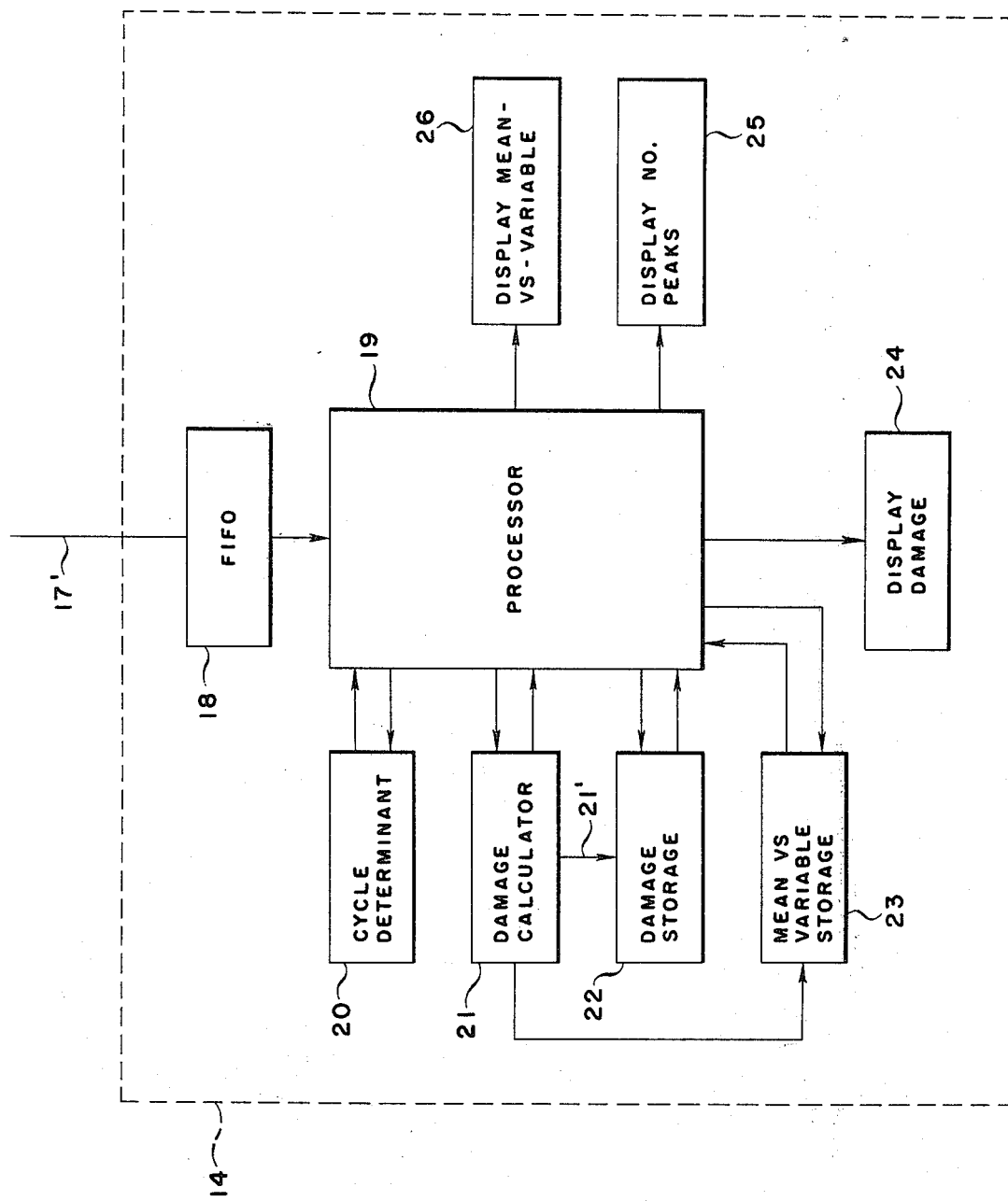
FIG. 3 is a schematic of a structural life computer itself as designed and constructed in accordance with the teachings of the present invention.

Referring now specifically to FIG. 3, the peaks passing into the computer 14 enter a first-in-first-out (FIFO) unit 18 within the computer 14. The FIFO unit 18 is a temporary storage digital register for peak values if they are being received too fast to be handled by a processor 19. Essentially this type of register is illustrated and described in an article entitled "The Electronic Memory" by Lothar Stern, in the Apr. 7, 1977 issue of *Machine Design* and in "Semiconductor Memories" by Warren W. Yates in the Aug. 23, 1976 issue of *Design News*. The FIFO unit 18 has a number of storage positions. As the first peak is received into the FIFO unit 18, it is placed in the last storage position and is the first peak processed out of the FIFO unit 18. If the specimen is generating peaks so fast that they cannot be processed immediately the storage positions will start to fill up. As each peak is processed out of the FIFO unit 18, all peaks are shifted one position to place them nearer the exit position.

Figure 4A:
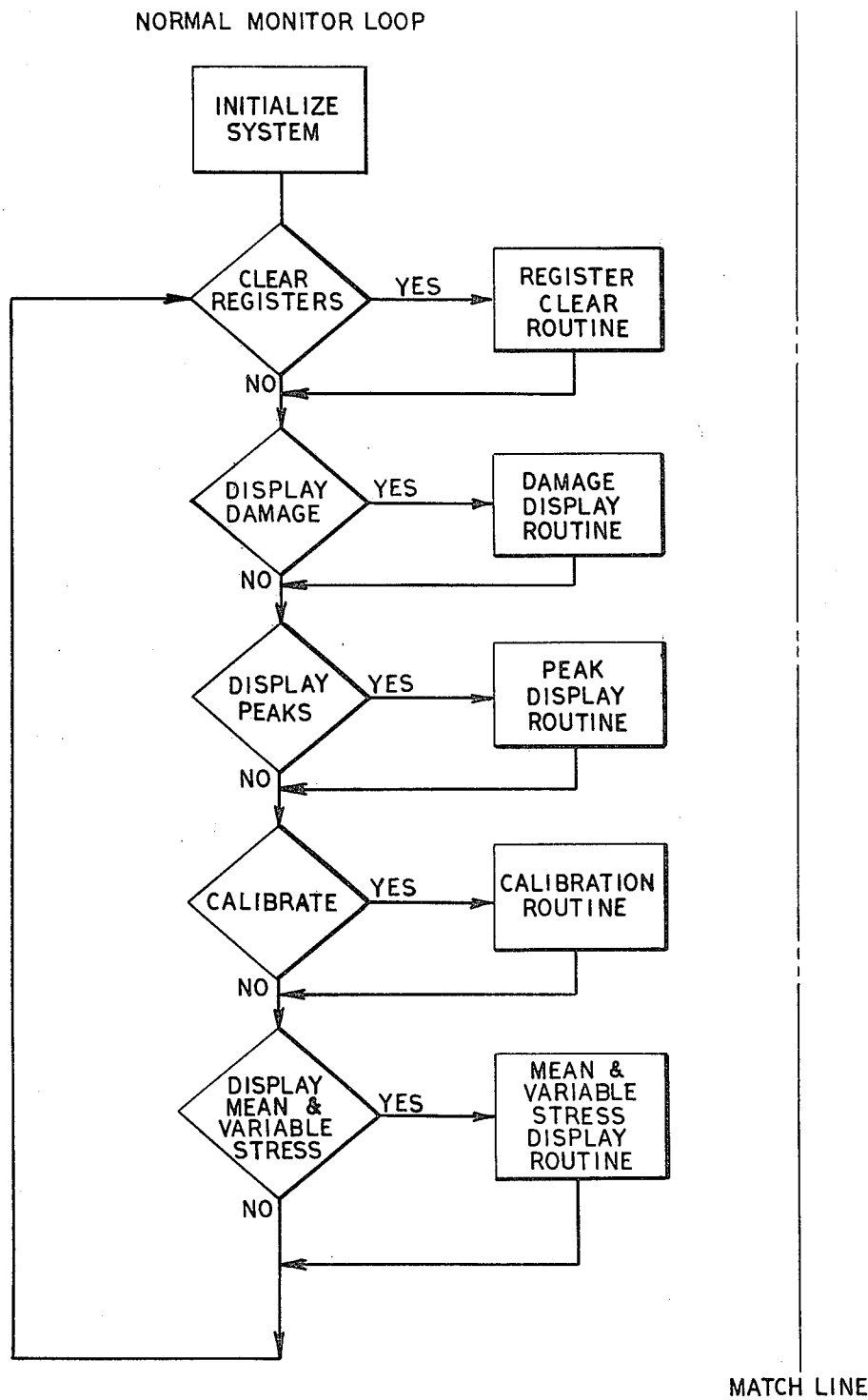
FIGS. 4A and 4B show a typical flow chart which depicts the operation of the processor shown in the computer of FIG. 3.
Figure 4B:
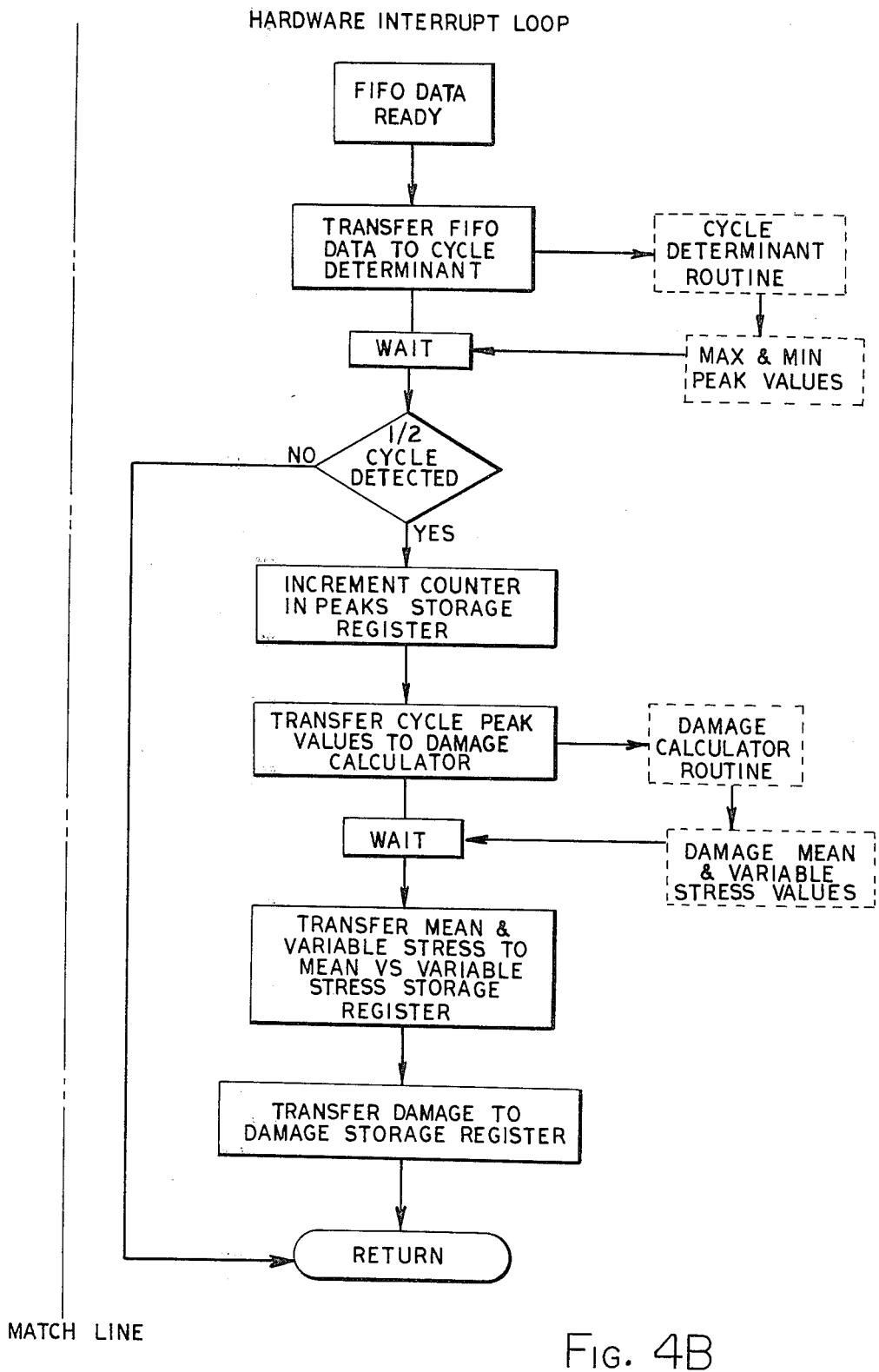
Figure 5A:
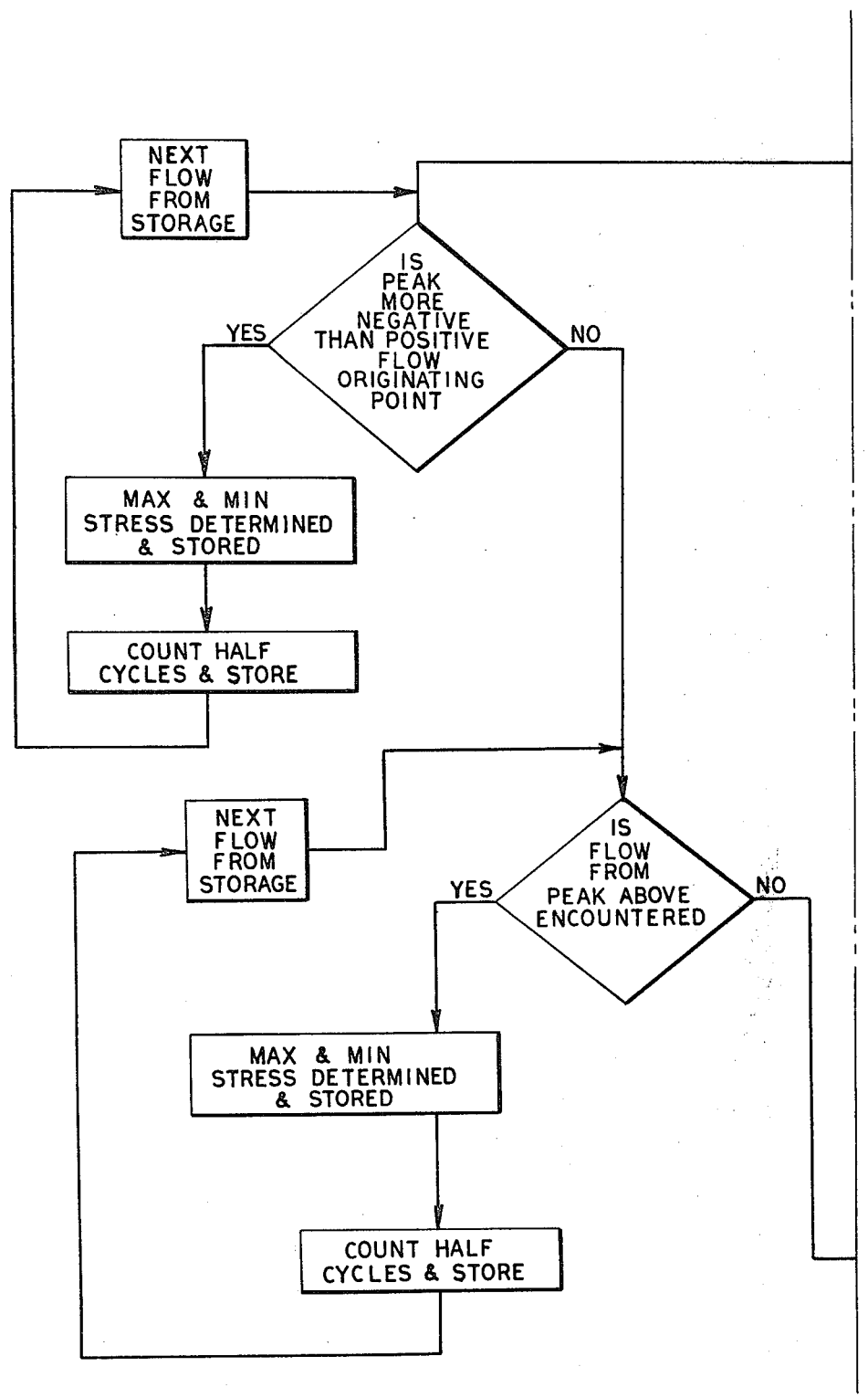
FIGS. 5A and 5B show a flow chart which depicts the operation of the cycle determinant shown in the computer of FIG. 3.
Figure 5B:
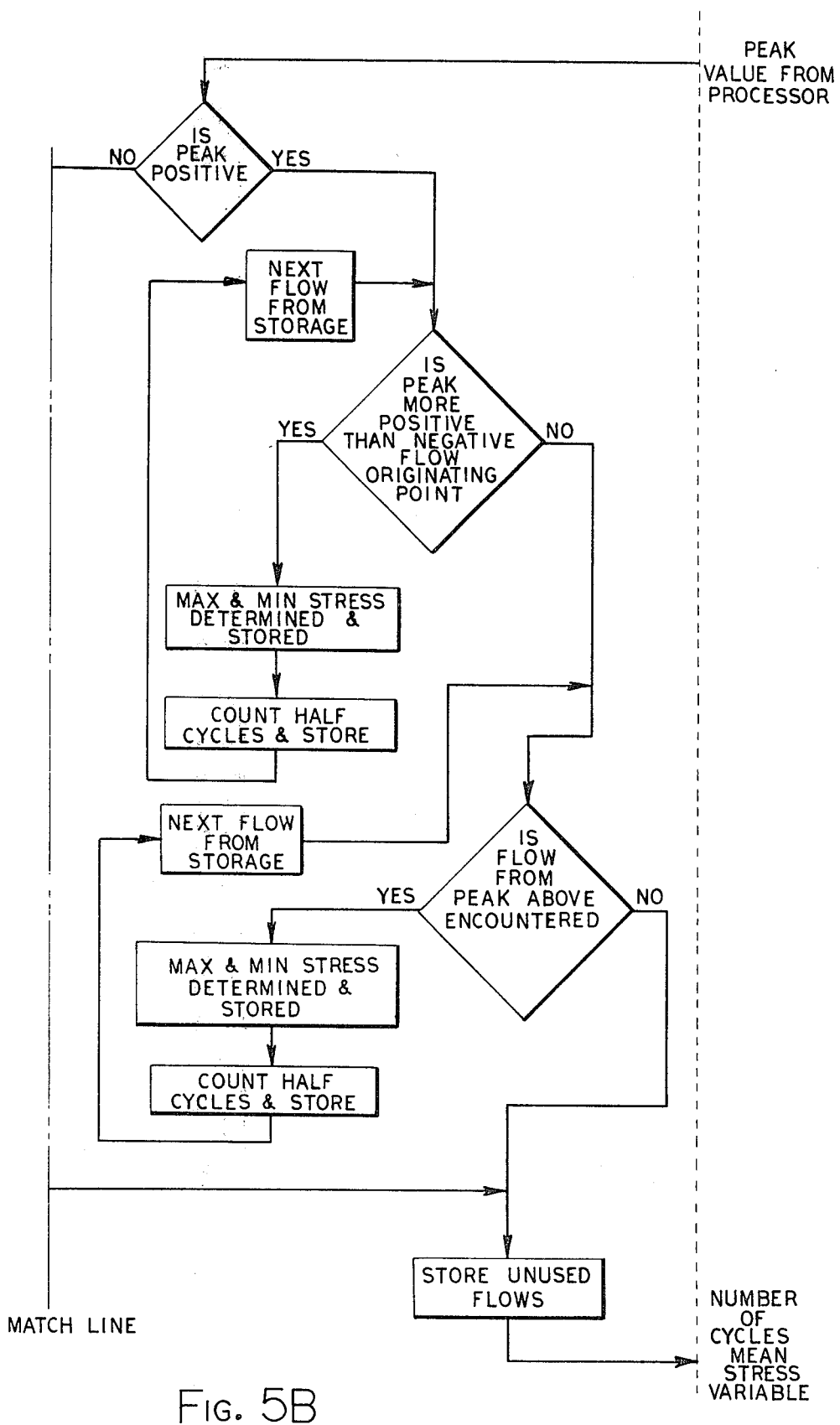

The processor 19 envisioned herein is of conventional design as generally discussed in the article "Anatomy of a Microcomputer" in the Mar. 11, 1976 issue of *Machine Design*. The Texas Instruments Company, Dallas, Tex. 19034, manufactures and sells such a processor under the designation RMS 8080 and also TMS 9900. The processor 19 eventually receives by a bus each peak value from storage in the FIFO 18. As shown in the flow chart of FIG. 4 the processor 19 controls, processes and directs the flow of data to and from the various components of the computer 14. The processor 19 sends the peak values to a cycle determinant 20 which decides by means of a preprogrammed algorithm whether or not a cycle has been concluded. The cycle determinant 20 is a microprocessor such as that used for the processor 19 which functions as illustrated in the flow chart of the algorithm of FIG. 5. *Design News* in an article "Basic Microcomputer Elements" beginning at page 59 of its May 16, 1977 issue describes typical hardware which can be used as the cycle determinant 20 when programmed as herein proposed for example by the flow chart of FIG. 5.

It is well known that determination of what comprises a cycle is a major factor in computing the durability of a structure. In repeated type loading it is easy to define a cycle, but in random type loading such as encountered in many structures, particularly those which comprise an airframe during flight, determination of what excursions comprise a cycle is much more complex. The type preprogrammed determination used in the present invention is a modification of the system known as "Rainflow", described on pages 300-307, "A Comparison of Two Cycle Algorithms" by J. M. Potter, of Society of Automotive Engineers *Transactions*, 1976, and also in "Journal of Materials", Volume 7, Number 1, Pages 71-87 by American Society for Testing and Materials. This modification allows the computation of structural damage half cycle by half cycle as it occurs rather than at the end of some period of usage as has been done previously.

In the so-called "Rainflow" cycle counting method, the stress-time history is plotted so that the time axis is vertically downward and the lines connecting the stress peaks are imagined to be a series of roofs. Several rules are imposed on rain dripping down these roofs so that cycles and half cycles are formed. Rain flow begins successively at the inside of each stress peak. The flow initiating at each peak is allowed to drip down and continue except that, if it initiates at a minimum peak, it must stop when it comes opposite a minimum peak more negative than the one from which it originated. Similarly, if the flow initiates at a maximum peak, it must stop when it comes opposite a peak more positive than the one from which it originated. A rain flow must stop also if it meets the rain from a peak above. When a flow is stopped, a half cycle is formed between the previous most positive and most negative peaks which have not already been used to form half cycles.

Previously, in the application of this method of cycle counting, the complete stress time history of a given set of peaks was used. In counting cycles or half cycles, the most positive and most negative peaks of a given set of peaks, such as a flight, were paired together to form a half cycle. Assuming that the most positive peak occurred first, a half cycle was counted between this most positive peak and the most negative peak which occurred before it in a flight and between this negative peak and the most positive peak occurring before it and so on until the beginning of the flight. After the most negative minimum peak in the flight, a half cycle was formed between this most negative peak and the most positive peak occurring after it in the flight, and between this positive peak and the most negative peak occurring after it in the flight and so on to the end of the flight. All the other peaks were counted as interruptions of these half cycles which has been formed and which always occur in pairs of equal magnitude to form full cycles.

In the modification of the "Rainflow" method used in the present invention, the peak stresses are processed in the following manner. As each peak is received and identified by the cycle determinant the cycle determinant looks into storage to ascertain the point at which "flow" dripping from the previous point originated. If the present peak is positive and the "flow" dripping from the previous negative peak originated at a point more negative than the present positive peak, a half cycle is formed between the point of origin and the previous negative peak. If the present peak is negative and the "flow" dripping from the previous peak originated at a point more positive than the present peak a half cycle is formed between the point of origin and the previous positive peak. Failing this test, a half cycle is not formed and the peak is then held in storage until a peak is encountered which will meet the requirements to match up with this peak. All peaks which are not used when first encountered are retained in storage in the proper sequence until they are used. The cycle determinant also looks into storage to see whether or not the "flow" running toward the present peak will encounter "flow" from a peak above. If flow from a peak above is encountered, a half cycle is formed between the point of origin of the present "flow" and the point at which it encounters the "flow" from above. The cycle determinant continues to look into storage for any previous "flows" which have not been used to form cycles. As each "flow" is used to form a half cycle, this "flow" is removed from storage and the sequence rearranged to reflect this removal. One of the novel and salient features of the present invention is the ability to hold and sort the "flows" in the proper sequence to allow proper formation of cycles and half cycles for use in the fatigue analysis of complex loading sequences in a real time situation as contrasted to mass storage for after-the-face evaluation.

Figure 6:
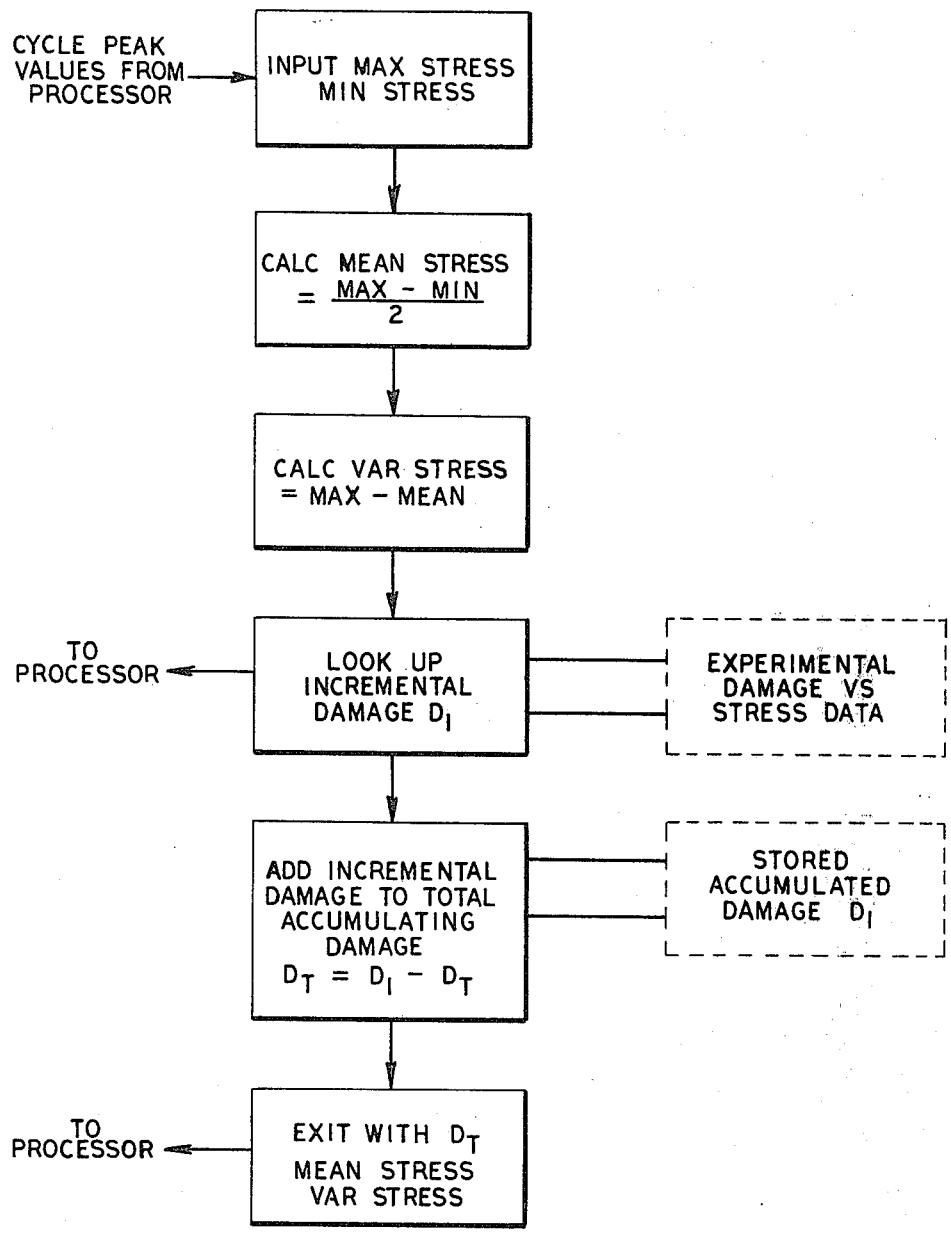
FIG. 6 is a flow chart showing the function of the damage calculator and damage storage shown in the computer of FIG. 3.

From the cycle determinant 20 which also counts the half cycles, all of the peak values are transmitted back to the processor 19 and then into a damage calculator 21. The damage calculator 21 is comprised of a microprocessor such as that used for processor 19 and an Eraseable Programmable Read Only Memory (EPROM) such as TMS 2708 made by Texas Instruments Company, Dallas, Tex. 19034. The miroprocessor has been preprogrammed to calculate classical fatigue damage, mean stress values, and variable stress values for each half cycle. The flow chart of this program is shown in FIG. 6. The damage calculator 21 computes the analytical structural damage value of the half cycle by comparing the incoming peak values with peak values of cycles and sequence effects that have previously been established and on which the damage has been determined experimentally. These experimental results were obtained by running tests on specimens at several mean and variable stress levels to determine the number of cycles to failure at the various levels. The reciprocal of the number of cycles to failure is the damage at that mean and variable stress level. This information is widely used in industry. U.S. Navy publication NAVAIR 01-1A-13, Fatigue of Aircraft Structures, 1954, Revised 1960 by Horace J. Grover, describes such damage calculators in Chapter VI entitled "Cumulative Damage".

The damage for a specific half cycle is accumulated with the value of all the previous half cycles to give a cumulative total structural damage. From the damage calculator 21 the total cumulative structural damage is placed in a damage storage register 22. The storage register 22 is a Random Access Memory (RAM) electronic component such as TMS 4042-2 made by Texas Instruments Company, Dallas, Tex. 19034. The damage calculator 21 also computes the mean and variable stress values of each half cycle. The mean stress value for a given half cycle is found by taking the maximum and minimum peak stress values and finding the stress value half-way between the two. The variable stress is found by subtracting the mean stress value from the maximum peak stress value. From the damage calculator 21 the occurrence of each mean and variable combination is accumulated in a mean-versus-variable storage register 23. The register 23 is a RAM electronic component such as that used for storage register 22. As the number of half cycles, damage, and cumulative mean-versus-variable occurrences are received by the processor 19 they are sent to their respective displays as well as to the various storge registers. Displays of the damage, number of half cycles, and cumulative mean-versus-variable occurrences are given by a damage display 24, a half cycle display 25, and a mean variable display 26 respectively. The displays are multi-digit light emitting diodes (LED) such as Part No. TIL 308 made by Texas Instruments Company, Dallas, Tex. 19034. These displays are controlled by the processor 19.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A structural life computer to receive electrical signals from a sensor located on a structure under cyclic loads which signals have been converted to digital signals corresponding to maximum and minimum values of stress changes in said structure, and to calculate the structural damage to said structure as indicated by said stress changes, said computer comprising:
a processor operatively connected to said sensor to receive said digital signals:
a cycle determinant operatively connected to said processor to separate said digital signals into discrete peak values corresponding to each stress change and return said peak values to said processor;
a damage calculator operatively connected to said processor to receive said peak values and compute the analytical structure damage value by comparing said discrete peak values with pre-established peak values determined experimentally and return said structural damage value to said processor;
a damage storage operatively connected to said damage calculator and to said processor to receive and accumulate the damage value computed as aforesaid and return said accumulated damage value to said processor; and
a display operatively connected to said processor to indicate said accumulated damage value.

2. The computer of claim 1 including a temporary storage digital register operatively connected between said sensor and said processor to receive and retain said digital signals in excess of those capable of being received and fed by said processor selectively to said cycle determinant, said calculator, said storage and said display.

3. The computer of claim 2 wherein said temporary storage digital register is a first-in-first-out unit.

4. The computer of claim 1 including a mean-versus-variable storage register connected to said processor.

5. The computer of claim 1 wherein said cycle determinant includes a preprogrammed algorithm.

6. The computer of claim 5 wherein said preprogrammed algorithm includes rainflow counting to count half cycles.

7. The computer of claim 6 wherein said damage calculator includes means to compute the mean and variable stress values of each said half cycle and said computer includes a storage for said mean and variable stress values and a display operatively connected to said processor to indicate said mean and variable stress values.

8. The computer of claim 4 wherein said preprogrammed algorithm includes a rainflow cycle counting method to determine the cycles and half cycles to be held and sorted by said cycle determinant.

9. The combination of claim 1 wherein said structure is an aircraft and said sensor is an electrical resistance type strain gage secured to a preselected area of said aircraft and operative to generate a signal corresponding to each change in load imposed thereon, said strain gage being electrically connected to a signal conditioner amplifier to receive the signals generated by said strain gage and convert them into signals corresponding to a change in stress in said preselected aircraft area and an analog-to-digital converter to change the signals converted by said signal conditioner and amplifier to said digital signals.

* * * * *